(12) United States Patent
Embler et al.

(10) Patent No.: US 7,566,093 B1
(45) Date of Patent: Jul. 28, 2009

(54) AIRFLOW DEFLECTOR ASSEMBLY

(76) Inventors: Susan Embler, 3952 Canal Rd., Lake Worth, FL (US) 33461; Kenneth Embler, 1859 Emilio La., West Palm Beach, FL (US) 33406; Mark Embler, 1221 Rawson Dr., Albany, GA (US) 31701

( * ) Notice: Subject to any disclaimer, the term of this patent is extended or adjusted under 35 U.S.C. 154(b) by 0 days.

(21) Appl. No.: 11/999,571

(22) Filed: Dec. 7, 2007

Related U.S. Application Data (60) Provisional application No. 60/873,339, filed on Dec. 8, 2006.

(51) Int. Cl.
*B60J 7/00* (2006.01)
(52) U.S. Cl. ............................. 296/180.1; 296/100.03
(58) Field of Classification Search ............. 296/180.1, 296/180.2, 180.3, 100.09, 100.03, 100.04, 296/100.05
See application file for complete search history.

(56) References Cited

U.S. PATENT DOCUMENTS

| | | | |
|---|---|---|---|
| 4,406,493 A | 9/1983 | Albrecht et al. | |
| 4,475,759 A | 10/1984 | Wine | |
| 4,573,730 A | 3/1986 | Gondert et al. | |
| 4,585,265 A | 4/1986 | Mader | |
| 4,749,226 A | 6/1988 | Heft | |
| 4,828,312 A | 5/1989 | Kinkel et al. | |
| 4,861,092 A * | 8/1989 | Bogard | 296/100.09 |
| 4,900,080 A | 2/1990 | Morris, II | |
| 5,067,766 A * | 11/1991 | Lovaas | 296/100.04 |
| 5,088,636 A | 2/1992 | Barajas | |
| 5,320,397 A | 6/1994 | Peterson et al. | |
| 5,352,008 A | 10/1994 | Denvir | |
| 5,556,152 A | 9/1996 | Dunlap et al. | |
| 5,564,776 A | 10/1996 | Schlachter | |
| 5,630,637 A | 5/1997 | Sauri | |
| 5,636,893 A | 6/1997 | Wheatley et al. | |
| 5,992,719 A | 11/1999 | Carter, III | |
| 6,174,012 B1 | 1/2001 | Saffold | |
| 6,179,361 B1 | 1/2001 | Sailors | |

(Continued)

FOREIGN PATENT DOCUMENTS

EP 0 280 441 A1 8/1988

OTHER PUBLICATIONS

Cooper, Kevin R.; "Pickup Truck Aerodynamics—Keep Your Tailgate Up;" Vehicle Aerodynamics 2004 (SP-1874); Warrendale, PA; 2004 (12 pages).

*Primary Examiner*—Joseph D Pape
(74) *Attorney, Agent, or Firm*—Malloy & Malloy, P.A.

(57) ABSTRACT

An airflow deflector assembly for an open bed truck or like vehicle including a plurality of preferably two cover sections each having a base and an attachment assembly cooperatively disposed and structured to adjustably interconnect the two cover sections facilitating their selective positioning into any one of a plurality of operative orientations. The selected operative orientation corresponds to the width of the trailing end of the open bed of the vehicle so as to so as to establish a substantially continuous air deflecting surface over the trailing end and thereby increasing the aerodynamics of the vehicle. The cooperative structuring of the attachment assemblies facilitate an adjustable sliding interconnection there between such that the bases of each cover section may be reciprocally positioned toward and away from one another to assume the preferred operative orientation corresponding to the width of the truck bed.

29 Claims, 10 Drawing Sheets

U.S. PATENT DOCUMENTS

| | | |
|---|---|---|
| 6,352,296 B1 | 3/2002 | Kooiker |
| 6,390,527 B1 | 5/2002 | Leftridge |
| 6,422,635 B1 | 7/2002 | Steffens et al. |
| 6,557,918 B2 | 5/2003 | Iafrate et al. |
| 6,561,560 B2 | 5/2003 | Brown et al. |
| 6,663,160 B2 | 12/2003 | Yarbrough et al. |
| 6,675,544 B1 | 1/2004 | Ou et al. |
| 6,702,359 B2 | 3/2004 | Armstrong et al. |
| 6,893,073 B2 | 5/2005 | Wheatley |
| 6,959,955 B2 | 11/2005 | Carter, III et al. |
| D513,226 S | 12/2005 | Sancer |
| 7,108,314 B2 * | 9/2006 | Lehmann .................. 296/180.1 |
| D534,856 S | 1/2007 | Herrera et al. |
| 2002/0101088 A1 | 8/2002 | Rigau |
| 2003/0184115 A1 | 10/2003 | Armstrong et al. |
| 2004/0164585 A1 | 8/2004 | Wheatley |

* cited by examiner

AIRFLOW DEFLECTOR ASSEMBLY

CLAIM OF PRIORITY

The present application is based on and a claim of priority is made under 35 U.S.C. Section 119(e) to a provisional patent application that is currently pending in the U.S. Patent and Trademark Office, namely, that having Ser. No. 60/873,339 and a filing date of Dec. 8, 2006 and which is incorporated herein in its entirety by reference.

BACKGROUND OF THE INVENTION

1. Field of the Invention

This invention is directed to an airflow deflector assembly removably positioned in covering relation to the trailing end of an open bed of a pick-up truck or like vehicle thereby improving the aerodynamics of the vehicle, reducing air drag and increasing fuel economy. The airflow deflector assembly comprises an air deflecting surface at least partially defined by a plurality of at least two cover sections adjustably interconnected to assume any one of a plurality of operative orientations dependent on the dimensions of the open bed.

2. Description of the Related Art

Utility vehicles such as, but not limited to pick-up trucks, have enjoyed increased popularity in recent years and are utilized to transport various items. In fact, according to a U.S. Census Bureau survey in 2002, there were about 38,000,000 pick-up trucks registered in the United States, which means that, on average, 1 in every 5 licensed driver owns a pick-up truck. Further, it was determined that about 45% of all trucks registered in the United States are pick-up trucks, and that about 77% of all trucks in the U.S. are utilized for personal transportation. Based on these figures, it is apparent that any improvement in the fuel efficiency of even a portion of the pick-up trucks operating in the U.S. today can translate into significant savings in our nation's annual fuel consumption. The benefits of this savings are twofold. First, there is the direct economic benefit to pick-up truck owners employing any such improvement as will be evidenced by cost savings at the pump as a result of less frequent refueling. A side benefit of this economic benefit is a reduction in the outflow of U.S. dollars for foreign oil products. The second benefit from reduced fuel consumption is the corresponding reduction in emissions generated from operation of our vehicles. As is becoming more and more apparent, the various emissions generated by human activities are significant contributors to phenomenon commonly known as global warming.

The typical pick-up truck includes an open bed having a tailgate connected to a trailing end thereof, wherein the tailgate may be selectively disposed in an upright, substantially vertical orientation or opened into a substantially horizontal orientation. When in the open orientation, the tailgate facilitates the loading of the open bed of the truck. However, there is a common misconception that when the tailgate is in a closed position it creates considerable drag and turbulence when the vehicle is traveling, and as a result of such drag, the fuel efficiency of the vehicle is significantly reduced.

In order to overcome this perceived problem, various types of cargo bed covers have been devised which normally are structured to removably cover the entire open bed area of the pick-up truck by extending from the tailgate to the cab portion thereof. Such bed covers vary significantly in structure and include canvas or flexible material covers as well as solid, single or multi-panel structures. Therefore, when properly utilized and installed, the bed covers are believed to reduce the air drag on the vehicle while traveling and thereby enhance the fuel economy. One popular and commonly used bed cover structure is generally referred to as the "tonneau cover". This type of open bed cover typically extends between the side walls of the cargo bed and conventionally covers substantially the entire length thereof. This category of bed cover is believed to generally improve the appearance of the vehicle as well as the aerodynamics. Because the tonneau cover is normally formed of a solid or rigid material it also provides protection for the storage of tools and other items in the bed.

While such covers of the type generally set forth above are believed to at least minimally overcome some problems, it has been found that covering the entire length of an open bed is less efficient in reducing the air drag on the vehicle. In contrast it is now believed that bed covers dimensioned to cover less than the entire length of the open bed are more efficient in reducing air drag and thereby increasing fuel economy of the vehicle. Accordingly, more recent attempts to increase the aerodynamic efficiency of pick-up trucks and like open bed vehicles include the provision of cover structures which overlie only a portion of the length of the open bed and preferably provide an air deflecting surface at or adjacent the trailing portion of the bed. Such known or conventional partial bed covers vary significantly in structure and operation and may include a one piece construction or multiple panels. When the partial cover comprises multiple cover panels, they are typically hingedly connected to one another or to the vehicle so as to provide access to the interior of the open bed.

More in particular, it has been shown that during forward motion, a negative pressure area is produced behind the cab of a pick-up truck, and that it is this negative pressure which contributes to the drag which subsequently reduces fuel economy, and not the force of the air impinging upon the tail gate of the vehicle, as is still commonly and inaccurately believed to be the case. In fact, both field and wind tunnel tests have shown that when the tailgate is in an open position, or totally removed, the air drag actually increases. This is due in part to the interaction of the airstream flowing over the cab with the air present in the bed of a pick-up truck at the rear of the bed. Furthermore, it has been shown that the airstream flowing over the cab only enters the bed when the tailgate is open or removed, or replaced by an open net or mesh material.

While known bed covers of the type described above may be operative for some of their respective intended purposes, there are still recognized disadvantages in their use. Accordingly, there is still a long recognized need for an efficient airflow deflector assembly which may be removably mounted on a vehicle having any one of a plurality of different operative orientations. As such, an improved and newly proposed airflow deflector assembly could be structured to adjustably extend transversely over a trailing end of the open bed. Further, the adjustable nature of the proposed airflow deflector assembly would be such as to allow it to be used on open bed vehicles of different sizes. Moreover, an improved airflow deflector assembly should also be capable of being easily and quickly adjusted to assume an appropriate one of a possible plurality of operative orientations in overlying relation to the trailing end of the vehicle bed. A further advantage may be realized by providing an improved airflow deflector assembly structured to permit quick and easy installation and/or removal from the vehicle bed, such as may be desired for storage, or to permit access to the entire bed of the pick-up truck for transport of a large load. Such an improved airflow deflector assembly will preferably be removably mounted proximate the rearmost portion of the bed, such that the forward portion of the bed is left open in order to significantly improve the aerodynamics as well as the fuel efficiency of the vehicle, and in particular, reducing the yaw resulting from crosswinds and the uplift of the bed during forward motion, both of which are know to reduce the fuel efficiency of pick-up trucks.

SUMMARY OF THE INVENTION

The present invention is directed to an airflow deflector assembly of the type capable of being removably disposed in any one of a plurality of operative orientations in covering, overlying relation to the trailing end of the open bed of a vehicle. A typical vehicle of the type referred to herein is commonly known as a pick-up truck and includes a bed having side walls or side rails extending between a tailgate and the cab portion of the vehicle. However, it is emphasized that the airflow deflector assembly of the present invention may be used with open bed vehicles other than the pick-up truck.

Specifically, the airflow deflector assembly of the present invention comprises a plurality of preferably two cover sections adjustably connected to one another as to assume any one of the aforementioned plurality of operative orientations. As described in greater detail hereinafter, each of the possible plurality of operative orientations is generally defined by the deflector assembly and its operative components extending entirely across the width of the trailing end of the open bed. As such, an air deflecting surface is provided in overlying relation to the trailing end of the open bed such that the aerodynamics of the vehicle is significantly increased, thereby resulting in improved fuel economy during operation of a pick-up truck equipped with such an improved airflow deflector assembly. More in particular, mounting the present airflow deflector assembly proximate the rearmost portion of the bed of a pick-up truck, such that the forward portion of the bed is left open, significantly improves the aerodynamics and reduces the yaw resulting from crosswinds and, as noted above, yaw is known to reduce fuel efficiency. Further, the downward pressure of the airflow against the air deflecting surface reduces the uplift of the bed during forward motion, thereby improving the traction of the vehicle and, once again, resulting in improved fuel efficiency of pick-up trucks.

Accordingly, the airflow deflector assembly of the present invention is structured for use on vehicles having an open bed of any of a variety of sizes. More in particular, depending upon the width or transverse dimension of the open bed, the two cover sections are adjustably interconnected so as to be reciprocally positioned relative to one another. Such reciprocal positioning facilitates the extension of the interconnected cover sections along and in overlying relation to substantially the entire width of the trailing end of the bed. When the airflow deflecting assembly is so positioned, an effective air deflecting surface is provided to accomplish a significant reduction in air drag on the vehicle.

Accordingly, each of the plurality of cover sections includes a base and an attachment assembly extending outwardly therefrom. Each base includes an exposed preferably solid outer facing. Each base also includes an at least partially open interior in which the corresponding attachment assembly is secured. Further, the attachment assembly in at least one preferred embodiment of the present invention comprises a plurality of preferably two elongated attachment legs disposed in spaced relation to one another. The length of the plurality of attachment legs of each cover section is sufficient to facilitate sliding interconnection with the attachment legs of the other of the two cover section. Therefore, this cooperative structuring of the attachment assembly of each cover section facilitates the aforementioned reciprocal positioning of the cover sections towards and away from one another so as to quickly and easily dispose the connected cover sections into any one of the possible plurality of operative orientations.

For purposes of clarity, the term "reciprocal positioning" is intended to describe the ability to move at least the base portions of the two connected cover sections towards or away from one another along what may be generally referred to as a linear path defined by the outwardly extending attachment legs associated with each of the cover sections. As such, the movement or reciprocal positioning of the cover sections relative to one another describes each of the base and the corresponding attachment assembly moving towards or away from another such that the air deflector assembly may assume any one of the aforementioned plurality of operative orientations and thereby accommodate the specific width of the trailing end of the bed of the vehicle on which the airflow deflector assembly of the present invention is mounted.

Accordingly, one of the plurality of operative orientations comprises the two base portions of each cover section being disposed in immediately adjacent or at least partially confronting relation to one another. Therefore, when disposed in this operative orientation, the air deflecting surface which provides the vehicle with enhanced aerodynamics is defined only by the exposed outer faces of each of the base portions of the interconnected two cover sections.

Alternatively, at least one other of the plurality of operative orientations comprises the bases of the interconnected cover sections being disposed in spaced relation to one another so as to accommodate a width of a vehicle having a larger open bed. Moreover, the attachment assemblies associated with each of the interconnected cover sections include at least a portion thereof structured to be disposed in an exposed position between the spaced apart base portions. As such, the exposed portions of the attachment assemblies are also disposed in an air deflecting position. Therefore in this other operative orientation, the air deflecting surface is defined collectively by the exposed faces or surfaces of the base portions and the exposed portions of the respective attachment assembly associated with each of the interconnected cover sections.

Yet additional operative orientations may be defined by the base portions of the cover sections being disposed in a greater or lesser spaced apart distance from one another, thereby exposing a greater or lesser portion of the corresponding attachment assemblies of each of the interconnected cover sections. Therefore, it should be apparent that any practical width of an open bed of a pick-up truck or like vehicle may have its trailing end completely covered by adjusting the length of the airflow deflector assembly.

Additional structural and operative features of the various preferred embodiments of the airflow deflector assembly of the present invention includes the plurality of legs associated with each of the cover sections being structured to define an adjustable, sliding engagement with the plurality of legs of the other cover section. In at least one embodiment, the cover sections comprise identical structural configurations thereby facilitating the manufacturing of the present assembly, i.e., requiring only a single cover piece configuration to be manufactured. More specifically, each of the plurality of legs associated with each attachment assembly preferably includes a tongue and groove connector assembly which facilitates the aforementioned sliding engagement, and further, the tongue and groove connector assemblies of each cover section are essentially indistinguishable from and interconnectable with one another. The sliding engagement of the tongue and groove connector assemblies effectively provides for the reciprocal positioning of the bases towards and away from one another to establish a precise length of the airflow deflector assembly corresponding to the width or transverse dimension of the trailing end of the open bed of the vehicle.

Other structural features of the various embodiments of the airflow deflector assembly of the present invention comprise a mounting assembly disposed and structured to interconnect at least one but preferably each of the plurality of cover sections to correspondingly disposed portions of the vehicle such that the airflow deflector assembly is secured in its intended position, especially during travel of the vehicle. Such a mounting assembly may take a variety of different forms, each of which may facilitate the removable but secure mounting or attachment of the airflow deflector assembly in a preferred operative orientation. The various embodiments of the mounting assembly are structured to removably secure the airflow deflector assembly to a pick-up truck or like open bed vehicle wherein a bed liner is or is not used to cover the open bed of the vehicle. Further, the mounting assembly is structured to permit quick and easy installation and/or removal of the airflow deflector assembly to or from the vehicle bed, such as may be necessary for storage of the assembly, for example, in the cab of the truck, and/or provide accessibility to the entire bed of the pick-up truck for transport of a large load.

Further, a retaining assembly may also be utilized in combination with one or more embodiments of the aforementioned mounting assembly. As such, the mounting assembly will be maintained in place and the inadvertent detachment thereof will be eliminated, especially when the vehicle is traveling at high rates of speed and/or over rough terrain.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
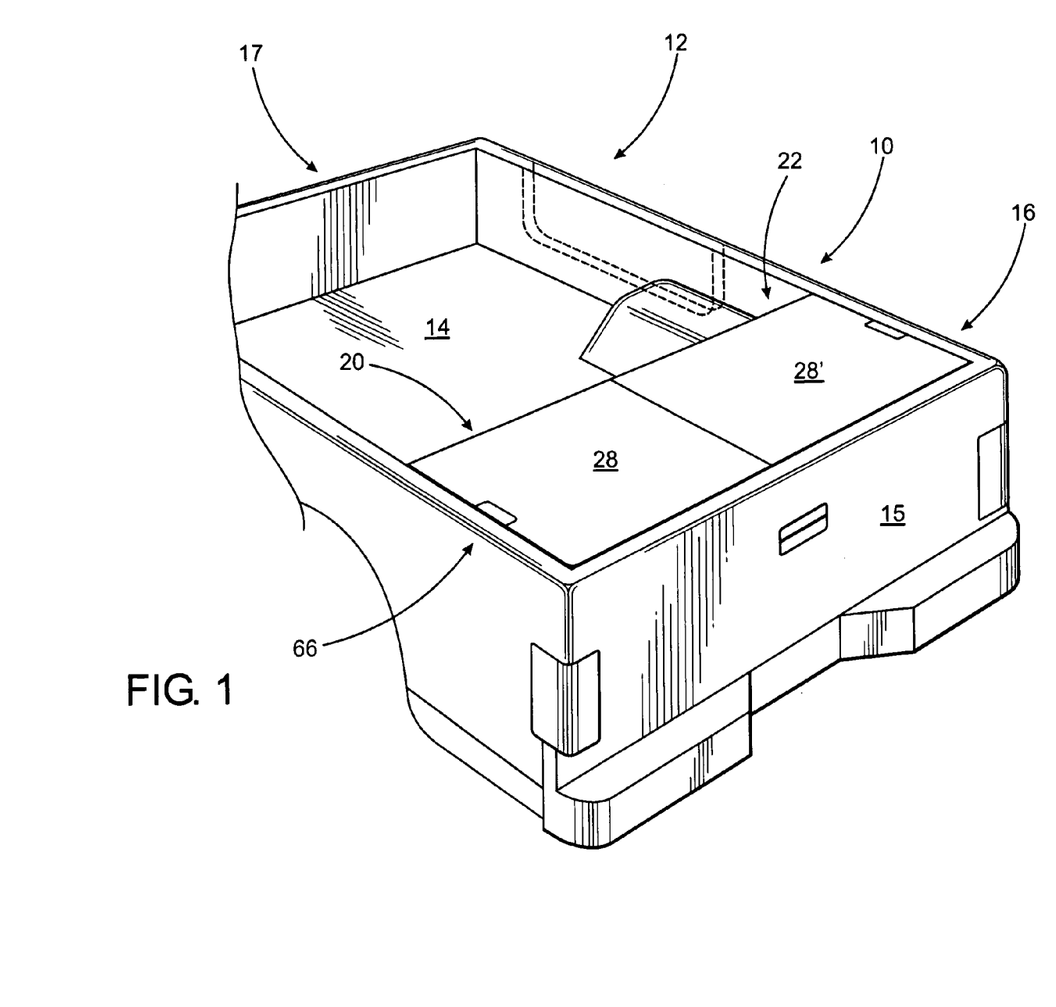
FIG. 1 is a perspective view in partial cutaway of the air deflector assembly of the present invention mounted in one of a plurality of operative orientations in overlying relation to the trailing end of an open bed of a vehicle.
Figure 2:
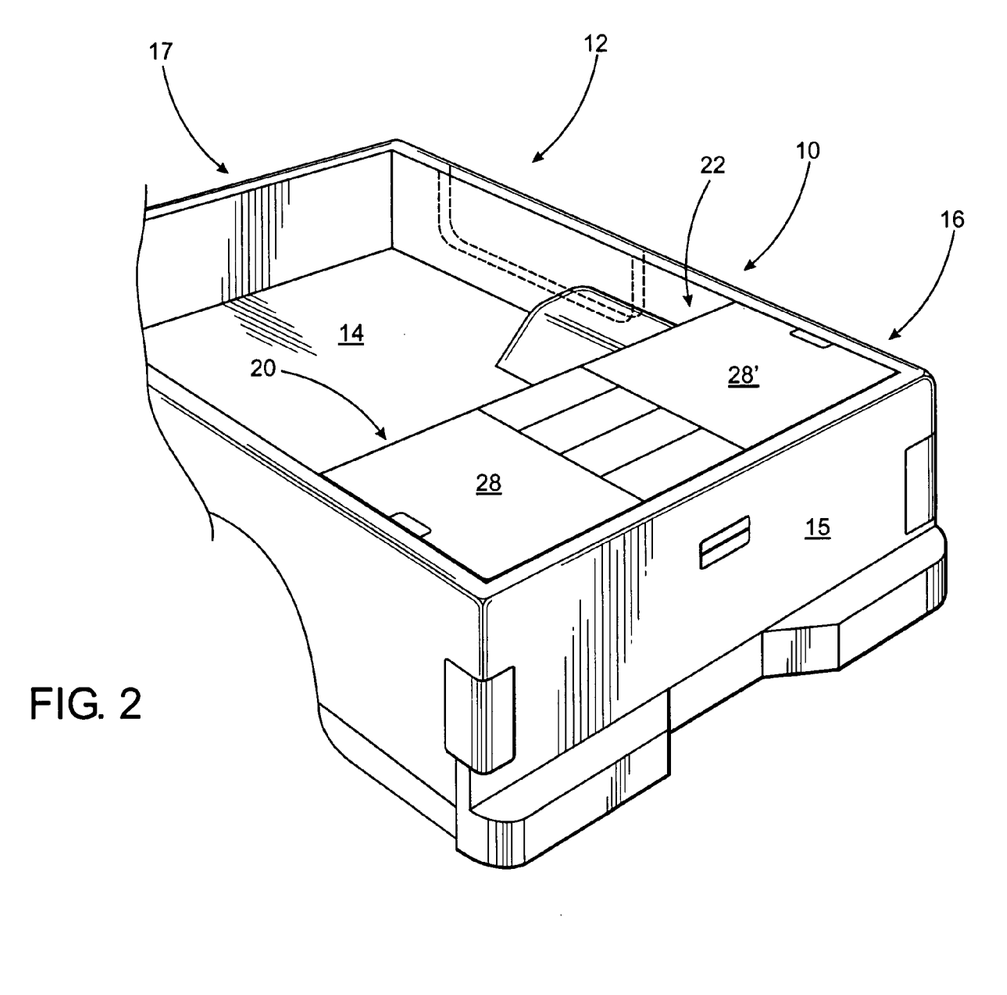
FIG. 2 is a perspective view in partial cutaway of the embodiment of FIG. 1 in a different one of a possible plurality of operative orientations.

As represented in the accompanying drawings, the present invention is directed to an airflow deflector assembly generally indicated as 10. The structural and operational features of the airflow deflector assembly 10 are such as to facilitate it being quickly, easily, and removably mounted or connected to a vehicle 12 in any one of a plurality of operative orientations, at least two of which are represented in FIGS. 1 and 2. The various operative orientations, as described in greater detail hereinafter, are such as to accommodate different sizes of an open bed 14 of the vehicle 12. More specifically, when in any of the aforementioned plurality of operative orientations, the airflow deflector assembly 10 will be disposed in overlying, covering relation to the trailing end 16 of the open bed 14 of the vehicle 12. As such, the trailing end 16 is represented as being immediately adjacent to and extending forwardly of the tailgate 15 of the vehicle 12. However, the preferred location of the airflow deflector assembly 10 is to be spaced a significant distance from the cab or leading end, generally indicated as 17, of the open bed 14.

Further, when in any of a possible plurality of operative orientations, the air deflector assembly 10 provides an air deflecting surface, clearly represented in FIGS. 1 and 2, which extends substantially entirely along the width or transverse dimension of the trailing end 16. Accordingly, the airflow created during the travel of the vehicle will be deflected off of the outer, exposed surface of the airflow deflector assembly 10 and thereby not enter the open bed 14 and interact with the air present therein. Therefore, in order to establish a substantially continuous air deflecting surface extending across substantially the entire width of the trailing end 16 of the vehicle 12, the airflow deflector assembly 10 is structured to demonstrate sufficient adjustability to accommodate different widths of beds 14 on different vehicles.

Figure 3:
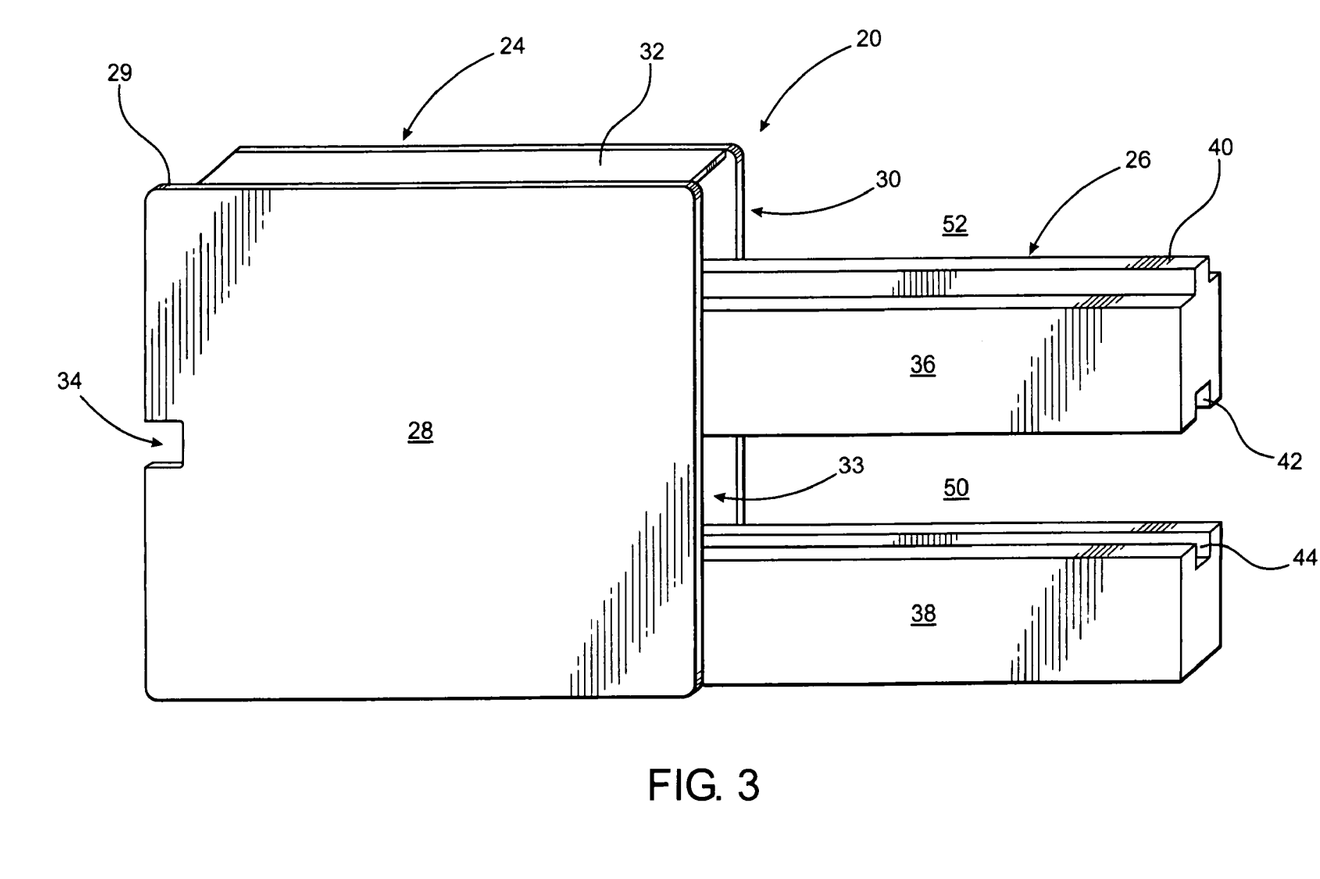
FIG. 3 is a top perspective view of one of the cover sections incorporated in the embodiment of FIGS. 1 and 2.
Figure 4:
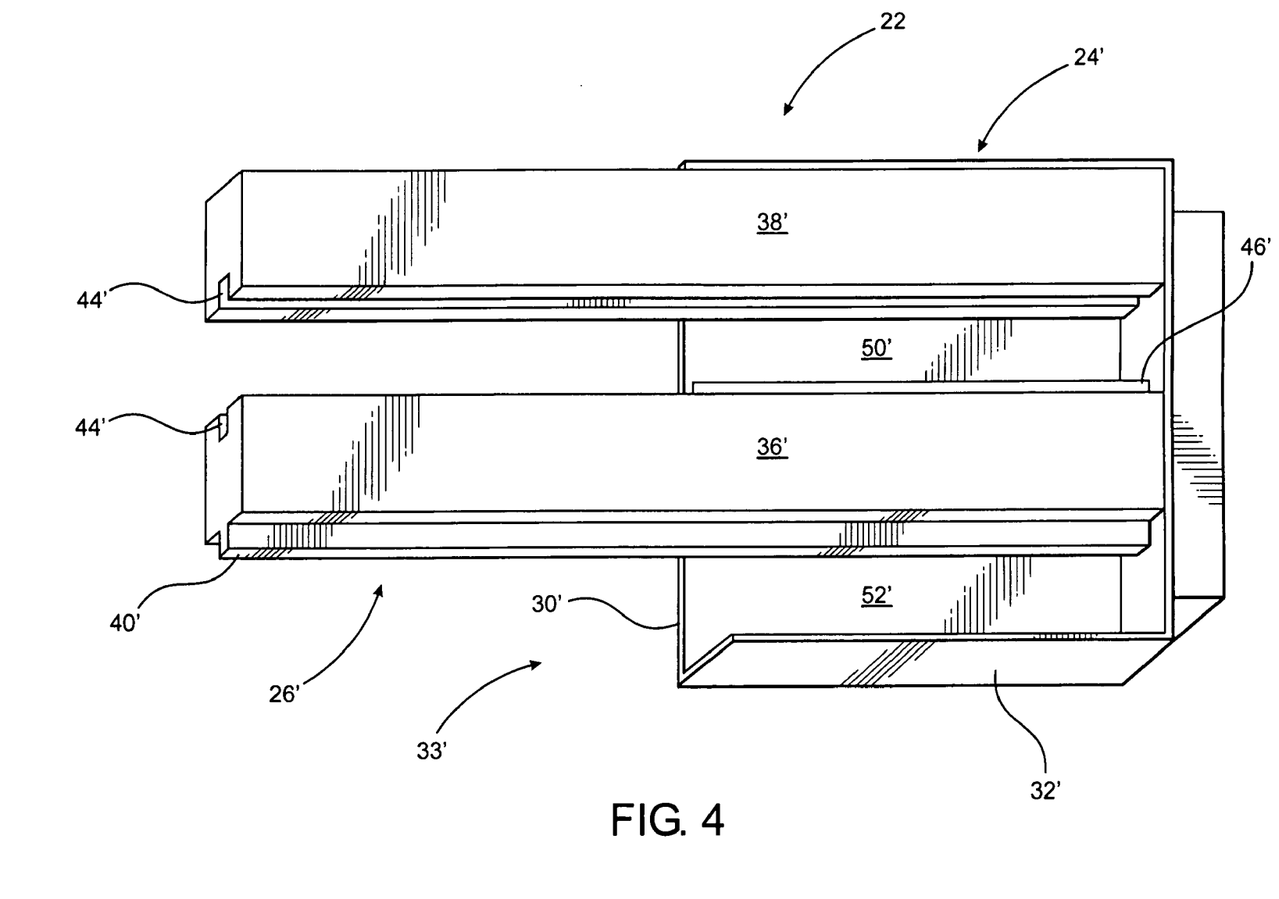
FIG. 4 is a top perspective view in partial cutaway of one other of the cover sections of the embodiment of FIGS. 1 and 2.

More specifically, the airflow deflector assembly 10 comprises a plurality of cover sections, such as, by way of example, cover sections 20 and 22. FIG. 3 represents an exterior top perspective view of cover section 20, while FIG. 4 represents a top perspective view of cover section 22, in partial cutaway, having the outer facing member 28' removed for purposes of clarity. As will be emphasized hereinafter, the structural configuration of the two cover sections 20 and 22 are substantially equivalent, and the placement or disposition of certain structural components facilitate an adjustable, sliding interconnection between the cover sections 20 and 22. Further, each of the cover sections 20 and 22 includes a base 24 and 24' having an outer facing member or plate like structure 28 and 28'. In addition, each of the cover sections 20 and 22 include a rear or bottom facing member 30 and 30', as well as a peripheral side portions 32 and 32' extending at least partially about the periphery thereof. Also, each of the bases 24 and 24' have an at least partially open interior 33 and 33' to accommodate the mounting or connection of the respective attachment assemblies 26 and 26'.

Each of the attachment assemblies 26 and 26' include at least one but more practically a plurality of outwardly extending, elongated legs 36 and 38 associated with the cover section 20 and 36', 38' associated with the cover section 22. The inner most or proximal end portions of each of the legs 36, 38 and 36', 38' are fixedly mounted or connected within the open interior 33 and 33' of bases 24 and 24', respectively. Also, the length of each of the legs 36, 38 and 36', 38' are such as to extend outwardly from the respective bases 24 and 24' a sufficient distance to facilitate a sliding, adjustable interconnection of the attachment legs 36, 38 with the attachment legs 36', 38'. Such an adjustable sliding interconnection will be described in greater detail with specific reference to FIGS. 3 through 7.

Additional structural features of the attachment assemblies 26 and 26' include each of the legs 36, 38 and 36', 38' having a tongue and groove connecting structure. More specifically, leg 36 and 36', respectively associated with cover sections 20 and 22, include an outwardly projecting, elongated tongue 40 and 40' and a groove 42 and 42' extending along the length of the respective leg. Also, each of the legs 38 and 38' include an elongated groove 44 and 44' extending along the length thereof. Further, each of the legs 36 and 36' include a tongue segment or "half-tongue" 46', which for purposes of clarity is only represented in FIG. 4. Therefore, the tongue and groove construction or connector assembly, as described above, facilitates a mating, sliding engagement between the legs 36 and 38 of the cover section 20 and the legs 36', 38' of the cover section 22. Also it should be noted that the respective legs associated with each of the attachment assemblies 26 and 26' are the "offset" from one another so as to accomplish the aforementioned adjustable, sliding interconnection between the two cover sections 20 and 22. Accordingly, the cooperative structuring and disposition of the above noted tongue and groove connector assembly and the offset placement of the legs of each attachment assembly 26 and 26' permits the cover sections 20 and 22 to comprise identical structural configurations, so as to facilitate manufacturing of the present air deflector assembly 10. This is readily demonstrated upon rotation of FIG. 4 by 180° and comparing the rotated FIG. 4 with FIG. 3. Specifically, such a comparison clearly illustrates that the arrangement and configuration of the tongue and groove connecting structures of legs 36 and 38 of cover section 20 are identical to the tongue and groove connecting structures of corresponding legs 36' and 38' of cover section 22.

Such sliding, adjustable interconnection between the attachment assemblies 26 and 26' is facilitated by each of the legs 36, 38 and 36', 38' being disposed in the represented predetermined spaced relation to one another and the peripheral portions of the respective bases 28 and 28'. As such, each of the attachment assemblies 26 and 26', further include respective receiving channels or like areas 50, 52 and 50', 52'. Such receiving channels extend between the respective plurality of legs 36, 38 and 36', 38' and also extend into the open interior 33 of the respective bases 24 and 24'. Further, the width or transverse dimension of each of the receiving channels 50, 52 and 50', 52' are equal to the width of the legs of the opposite attachment assembly 26 and 26' which will be received therein.

Figure 5:
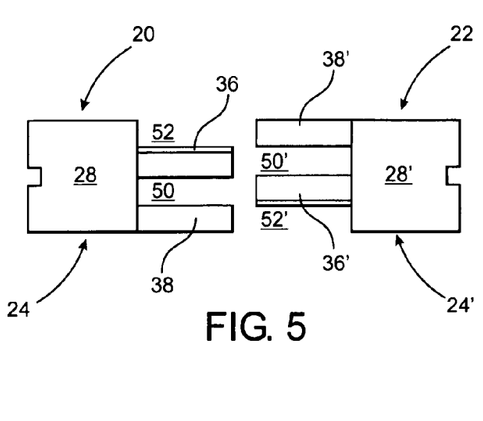
FIG. 5 is a top plan view of two cover sections incorporated in the embodiment of FIGS. 1 and 2 in a preassembled relation to one another.

As clearly represented in FIG. 5, prior to being assembled, each of the cover sections 20 and 22 are disposed in a preassembled position or orientation. Accordingly when the cover sections 20 and 22 are movably interconnected, the legs 36 and 38 of the cover section 20 pass into and along respective channels 50' and 52' of cover section 22. In doing so tongue 40 enters and slides along the length of groove 44'. At the same time, tongue segment 46' will enter and slide along the length of grove 42. Concurrently, tongue 40' and groove 42' will slidingly engage correspondingly positioned ones of the groove and tongue segment 46' (not shown in FIG. 5 for purposes of clarity).

Figure 6:
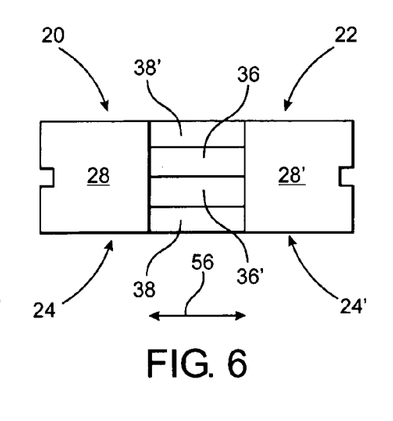
FIG. 6 is a top plan view of the cover sections of the embodiment of FIG. 5 in an assembled relation to define one of a plurality of operative orientations as represented in FIG. 2.
Figure 7:
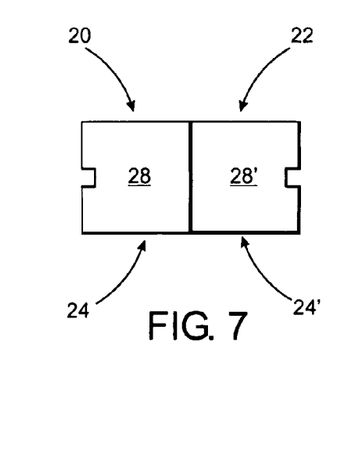
FIG. 7 is a top plan view of two cover sections of the embodiment of FIGS. 5 and 6 in an assembled relation to one another to define the operative orientation of the embodiment of FIG. 1.

FIG. 6 represents the two cover sections 20 and 22 being in at least one assembled, operative orientation substantially equivalent to the operative orientation of FIG. 2. Similarly, FIG. 7 represents the cover sections 20 and 22 in another operative orientation generally representative of that disclosed in FIG. 1. Therefore, a first operative orientation represented in FIG. 1 is at least generally defined by the two facing portions 28 and 28' being disposed in immediately adjacent and/or at least partially confronting engagement with one another. In such an operative orientation, the attachment assemblies 26 and 26', respectively including the plurality of legs 36, 38 and 36', 38', are disposed in a non-exposed position within the open interiors of the opposite base 28 or 28' of the cover sections 20 and 22 which are connected to one another. In contrast, FIG. 6 represents the at least one additional operative orientation generally as disclosed in FIG. 2. As such, the respective attachment assemblies 26 and 26' include at least a portion of each of the plurality of legs 36, 38 and 36', 38' being exposed and not being located within the open interior 33 of the respective bases 28' and 28.

Therefore, it should also be apparent that the airflow deflector assembly 10 assumes the operative orientation of FIGS. 1 and 7 to accommodate a relatively smaller width or transverse dimension of an open bed 14 of the vehicle 12. However, larger pick-up trucks or like vehicles require the bases 28 and 28' to be positioned in spaced relation to one another as represented in FIGS. 2 and 6, thereby at least partially defining another operative orientation of the present airflow deflector assembly 10.

Moreover when the air deflector assembly 10 assumes the operative orientation of FIGS. 1 and 7, an air deflecting surface is defined substantially exclusively by the outer surfaces of the exposed facing members 28 and 28' as represented. In contrast, when the airflow deflector assembly 10 is in the operative orientation of FIGS. 2 and 6, the air deflecting surface is collectively defined by the exposed or outer facing members 28 and 28' as well as the exposed portions of the attachment legs 36, 38 and 36', 38'. Moreover, in order to form a continuous, or at least substantially uninterrupted air deflecting surface when in the operative orientation of FIGS. 2 and 6, the width of each of the attachment legs 36, 38 and 36', 38' are collectively equivalent to the width of the exposed facing members 28 and 28' of the bases 24 and 24'.

Therefore, the adjustable, sliding interconnection between the cover sections 20 and 22 is facilitated by the aforementioned and above described tongue and groove connector assembly which facilitates a reciprocal positioning of the cover assemblies 20 and 22 relative to one another. This reciprocal positioning serves to efficiently and quickly dispose the airflow deflecting assembly 10 into the preferred operative orientation dependent on the width or transverse dimension of the open bed 14 of the vehicle 12. Such reciprocal positioning is schematically represented by directional arrow 56 included in FIG. 6 indicating selective movement of the cover sections 20 and 22 towards or away from one another.

Figures 10, 10C:
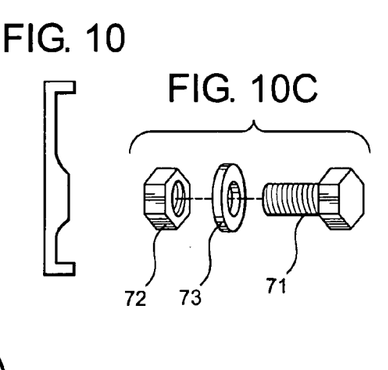
FIG. 10 is an additional component of the mounting assembly represented in FIG. 8.
FIG. 10C is a connector assembly associated with the embodiment of FIG. 10.
Figures 10A, 10B:
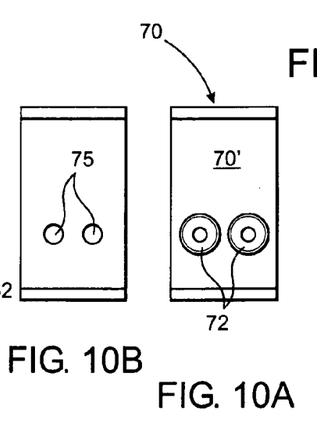
FIG. 10A is a front view of the structure represented in FIG. 10.
FIG. 10B is a rear view of the structure represented in FIGS. 10 and 10A.

Additional structural and operative features of the present invention are represented in FIGS. 8 through 8B, 9 through 9B and 10 through 10C. More specifically, in order to maintain the air deflector assembly 10 in any one of the plurality of operative orientations, a mounting assembly, generally indicated as 60 is provided. The mounting assembly 60 is structured to removably clamp or otherwise maintain the airflow deflector assembly 10 on the vehicle 12 in the selected operative orientation as intended. Accordingly, the mounting assembly 60 includes a support plate 62 having an upper, integrally or otherwise fixedly secured supporting flange 64 disposed to overlie the side rail or side panel 66 of the vehicle 12. In addition, the plate 62 includes an outwardly protruding member in the form of a pin or finger having a bulbous or other appropriately enlarged configuration as at 69. The mounting assembly 60, in at least one embodiment, also includes a clamping plate 70 which is interconnected to support plate 62 by an appropriate connector assembly, including one or more threaded bolts or like connectors 71. Connectors 71 are threadedly attached to mounting nuts or like members 72, wherein spacing washers 73 extend therebetween. As depicted in FIG. 10A, the receiving nut 72 may be fixedly or integrally secured to the outer face or surface 70' of the clamping plate 70. As represented in FIG. 10B, appropriate apertures 75 are formed in the clamping plate 70 so as to accommodate passage therethrough of the threaded connectors 71.

Figure 8:
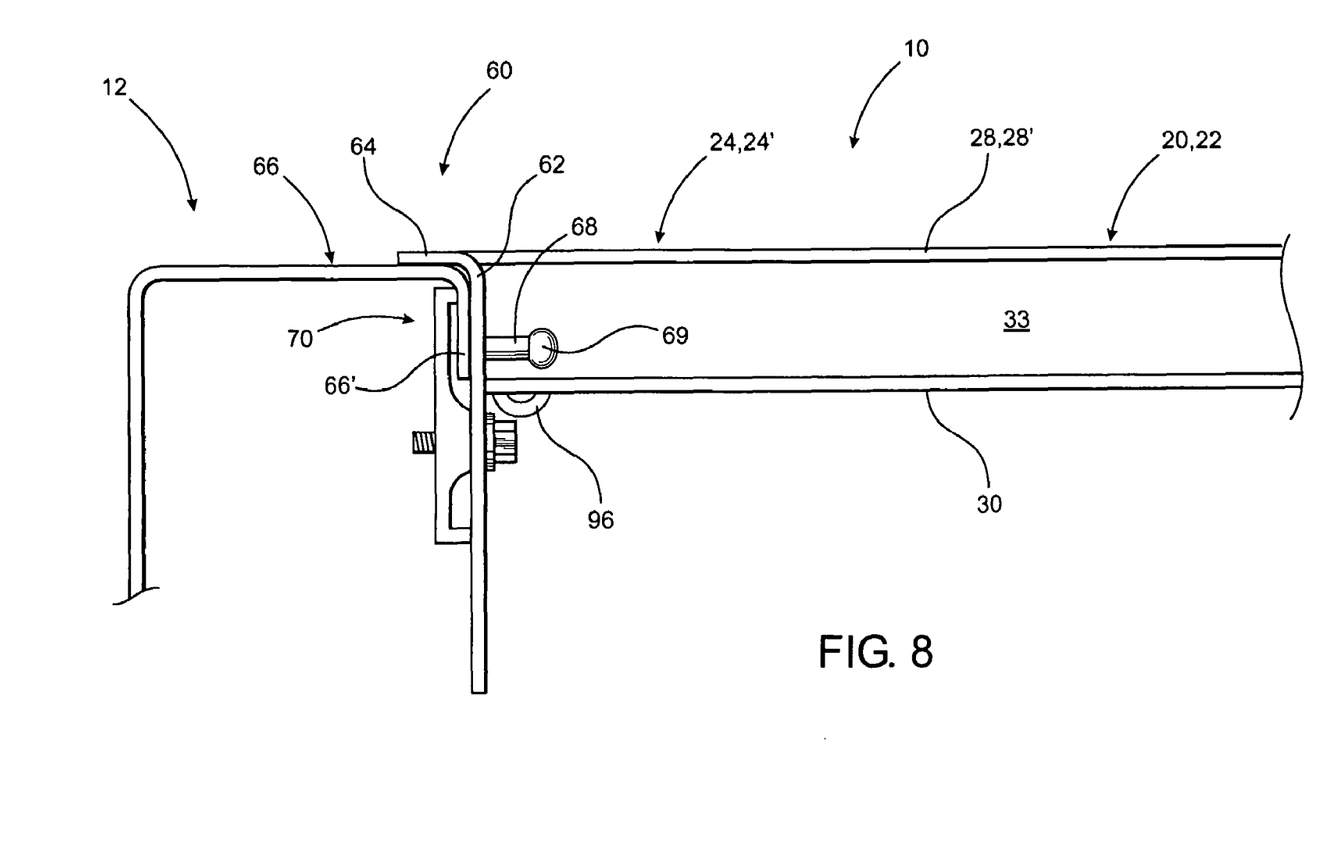
FIG. 8 is a sectional view of a mounting assembly disposed in interconnecting relation between one cover section and a corresponding portion of the vehicle.
Figures 8A, 8B:
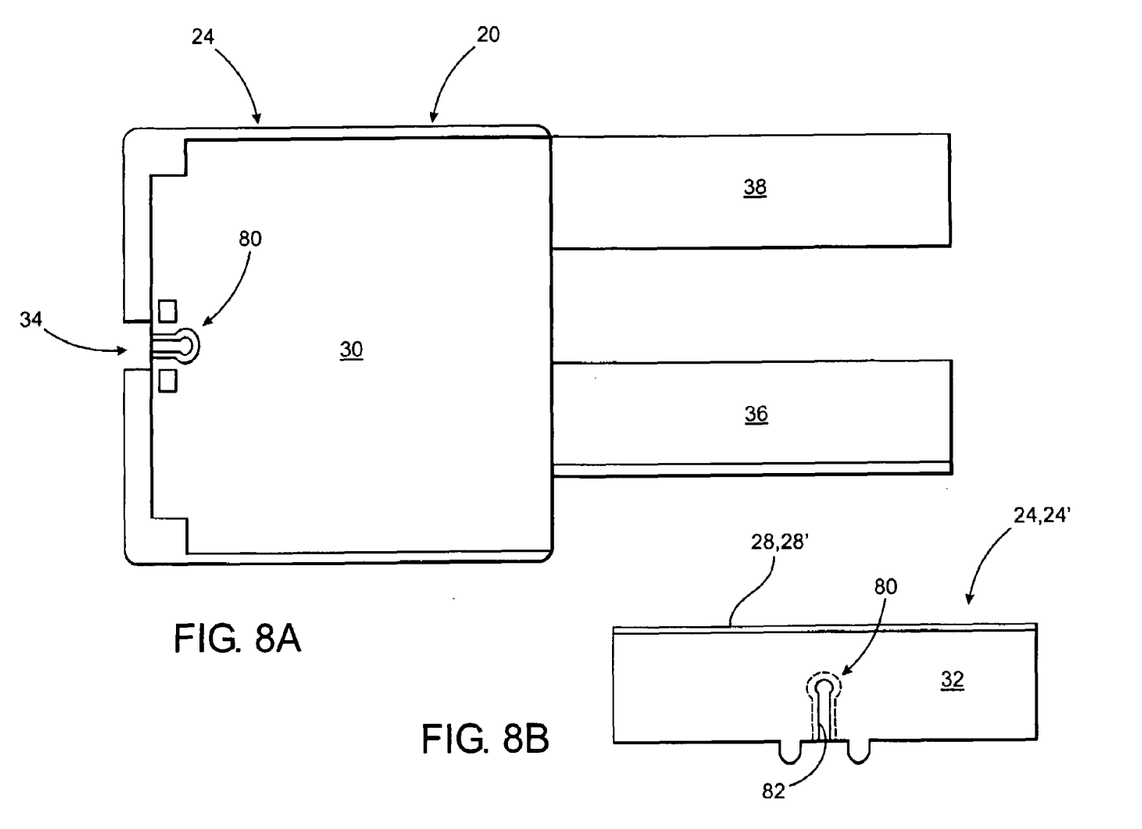
FIG. 8A is a bottom plan view of a cover section associated with the embodiments of FIGS. 1 through 8 representing structural features facilitating the interconnection to the mounting assembly as represented in FIG. 8.
FIG. 8B is an end view of the embodiment of FIG. 8A.
Figures 9, 9B:
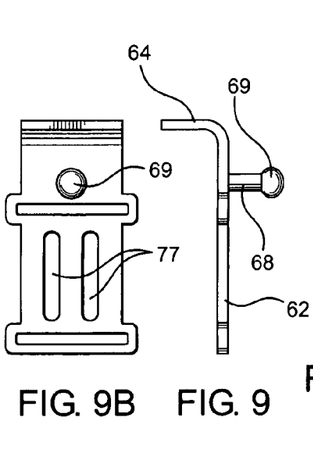
FIG. 9 is a side view of one of the components associated with the mounting assembly as represented in FIG. 8.
FIG. 9B is a front view of the structure represented in FIG. 9.
Figure 9A:
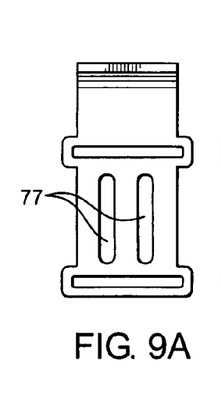
FIG. 9A is a rear view of the structure represented in FIG. 9.

Similarly, appropriate, elongated channel like apertures 77 are formed in and pass through the support plate 62 so as to facilitate an adjustable clamping engagement between the support plate 62 and the inner clamping plate 70 as clearly represented in FIG. 8. The secure attachment of one or both of the bases 24, 24' to a side rail or other appropriate portion 66 of the vehicle 12 is accomplished by sandwiching a lip or flange 66' between the outer and inner plate 62 and 70 of the attachment assembly 60. In this clamped orientation, the protruding member or finger 68 will extend inwardly towards the interior of the open bed 14. Cooperative structuring of each of the bases 24 and 24' allows for the removable but secure attachment of the respective cover sections 20 and 22 to the attachment assembly 60 through the provision of a notch assembly 80. The notch assembly 80 includes one or more notches 82 formed in the end or side wall 32 which is correspondingly disposed to the side panel or rail 66 to which the airflow deflector assembly 10 is attached. Accordingly, the notch(s) 82 is dimensioned and configured to receive the protruding member or finger 68 therein as represented in FIG. 8.

As set forth above, the end portions of each of the bases 24 and 24' include the provision of a recess 34. The recess 34 is dimensioned and configured to accommodate the top portion 64 of support plate 62. More in particular, the recess 34 formed in the respective bases 24 and 24' facilitates positioning of the support plate 62 in the intended position relative to the side rail or panel 66 of the vehicle 12 as represented in FIG. 8.

Figure 11:
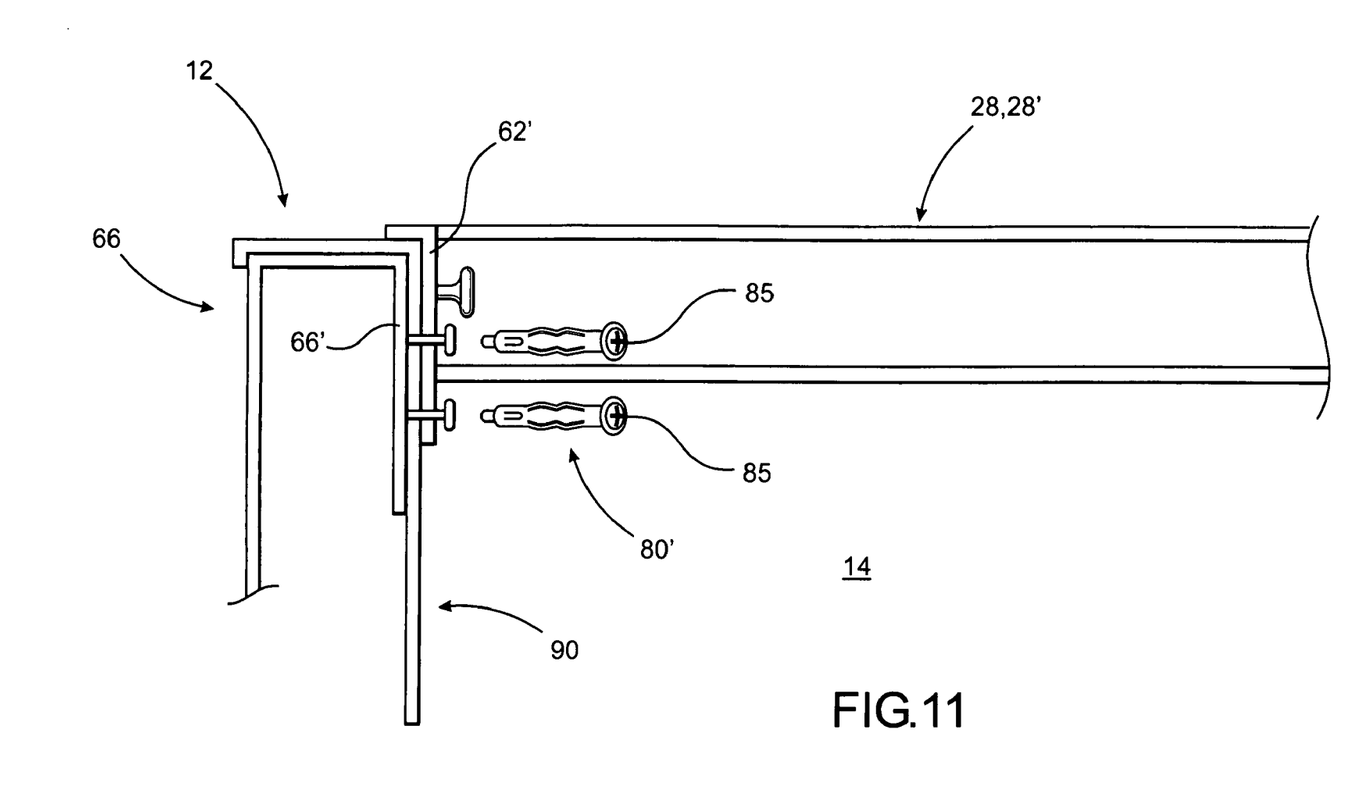
FIG. 11 is a side view in partial cutaway and section representing the attachment or mounting of at least one cover section in one of a plurality of operative orientations wherein the open bed includes a bed liner associated therewith.
Figures 12, 12A:
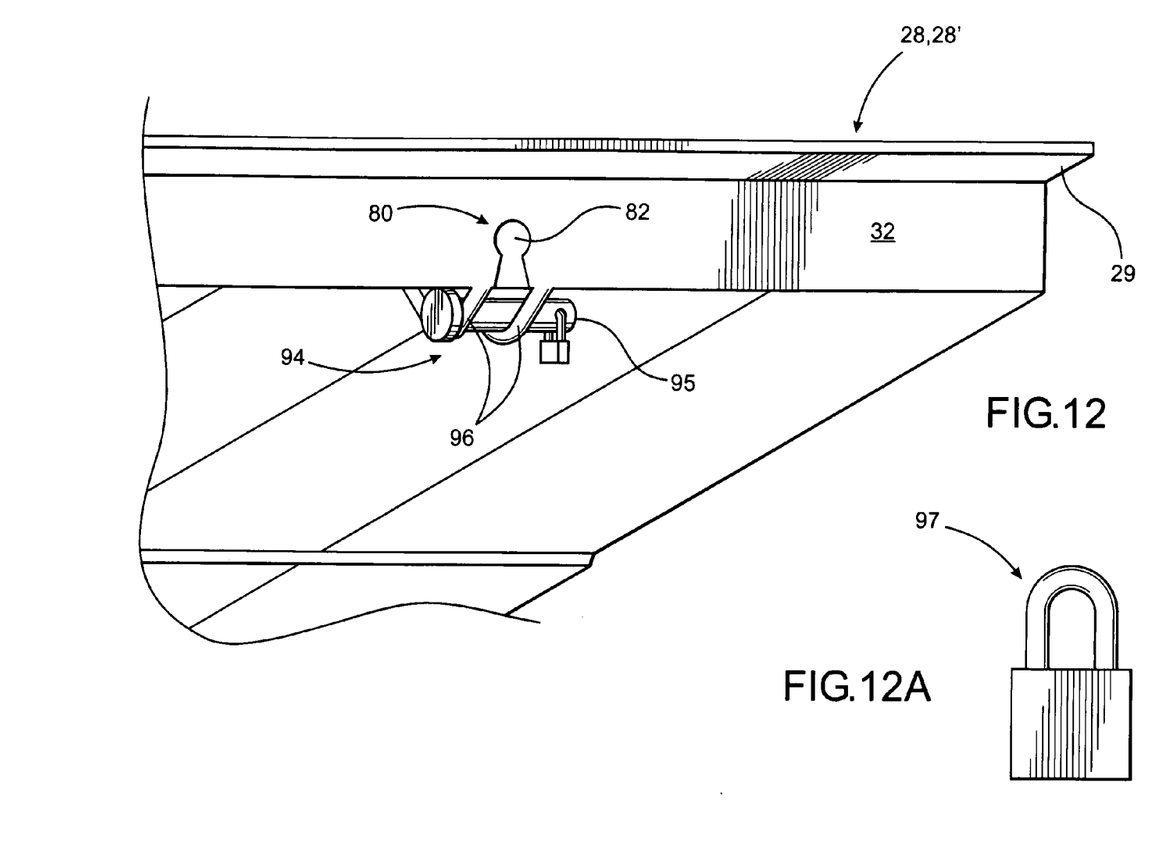
FIG. 12 is a perspective view in partial cutaway of a retaining assembly of the present invention.
FIG. 12A is a locking mechanism associated with the embodiment of FIG. 12.

Yet another embodiment defining the attachment assembly is represented in FIG. 11. More specifically, the attachment assembly 80' is utilized when the open bed 14 includes a bed liner 90 placed therein. In this embodiment, support plate 62 is represented as 62' and is structurally modified to be mounted on the vehicle 12 without the requirement or provision of the clamping plate 70, represented in FIG. 8. More specifically, when a liner 90 is utilized, one or more locking or expansion bolts or like connectors 85 extend through the plate 62' and are clamped in engaging relation to the liner 90 as well as the depending flange 66' of the side rail or panel 66 of the vehicle 12.

With primary reference to FIGS. 12, 12A and 13 through 13B, yet another operative and structural feature of the present invention is the provision of a retaining assembly generally indicated as 94. The retaining assembly 94 includes a retaining pin or like member 95 which is disposed in receiving, relation to a holder, cradle or like structure 96. When positioned in an operative retaining position represented in FIG. 12, any one of a variety of different locks or like structures, generally indicated as 97, may be utilized to maintain the retaining pin 95 in its retaining position. The retaining pin 95 is thereby disposed in interruptive relation to the displacement of the protruding member 68 from the notch assembly 80. This assures that the bases 24, 24' are not inadvertently detached from the protruding member 68 of the attachment assembly 60. Therefore, the base 24 or 24' are prevented from becoming inadvertently detached from its intended operative orientation even when the vehicle 12 is traveling at high speeds and/or over relatively rough terrain.

Figure 13:
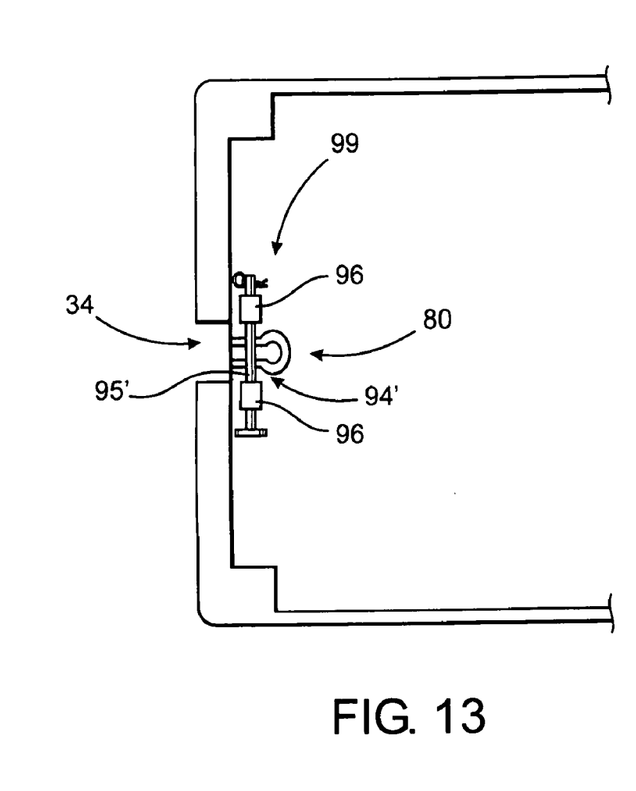
FIG. 13 is a bottom view in partial cutaway of yet another embodiment of the retaining assembly of the present invention.
Figure 13A:
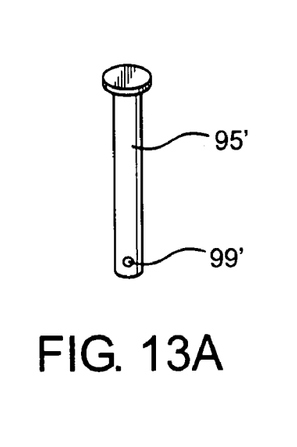
FIG. 13A is a component associated with the embodiment of the retaining assembly as represented in FIG. 13.
Figure 13B:
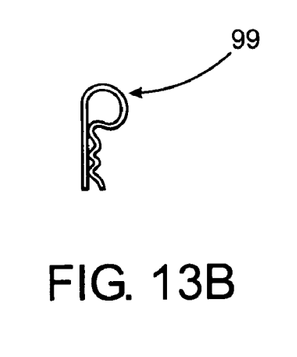
FIG. 13B is another component associated with the retaining assembly of the embodiment of FIG. 13.

Yet another embodiment of the retaining assembly is represented in FIGS. 13 through 13B and is generally indicated as 94'. In this embodiment the retaining assembly 94' is disposed in interruptive relation with the protruding member 68 once it is disposed within the notch assembly 80. More specifically, a retaining pin 95' is removably mounted within the retaining cradle 96 such that the length thereof extends in interruptive relation to the protruding member 68 as it attempts to pass outwardly from the notch assembly 80. In order to assure and retain placement of the retaining pin 95' in its intended, interruptive orientation as represented in FIG. 13A, a cotter pin 99 may pass through an appropriate aperture 99' or other structure associated with the retaining pin 95'.

Accordingly, the various preferred embodiments of the present invention are directed to an airflow deflector assembly 10 which may assume any of a plurality of operative orientations thereby rendering it adaptable to different vehicles 12 having open beds 14 of various sizes, and in particular, various bed widths. The aerodynamics of any of a plurality of vehicles 12 may thereby be significantly enhanced by the reduction of air drag thereon.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An airflow deflector assembly for an open bed of a vehicle comprising:
    a plurality of cover sections adjustably connected to one another to assume a plurality of operative orientations,
    each of said plurality of cover sections including a base and an attachment assembly extending outwardly from said base,
    said attachment assemblies of connected ones of said plurality of cover sections connected in sliding engagement with one another and being relatively reciprocal in a direction transversely across a width of the open bed, and each of said operative orientations comprising said plurality of cover sections collectively extending transversely across and in overlying relation to substantially an entire width of a trailing end of the open bed.

2. The airflow deflector assembly as recited in claim 1 wherein at least one of said plurality of operative orientations comprises said attachment assemblies disposed in a non-exposed position.

3. The airflow deflector assembly as recited in claim 2 wherein said attachment assembly of each of said plurality of cover sections is disposed transversely across the width of the open bed and on an interior of a connected other one of said plurality of cover sections.

4. The airflow deflector assembly as recited in claim 1 wherein at least one of said plurality of operative orientations comprises at least a portion of each of said attachment assemblies of connected ones of said plurality of cover sections being disposed in an exposed position transversely across the width of the open bed and exteriorly of said base of the other of said connected ones of said plurality of cover sections.

5. The airflow deflector assembly as recited in claim 4 wherein said at least one operative orientation further comprises said portion of each of said attachment assemblies being disposed transversely across the width of the open bed in an air deflecting position overlying the trailing end of the open bed.

6. The airflow deflector assembly as recited in claim 1 wherein said attachment assembly of each of said plurality of cover sections includes at least one elongated arm, said arms of connected ones of said plurality of cover sections disposed transversely across the width of the open bed and in reciprocal, sliding engagement with one another.

7. The airflow deflector assembly as recited in claim 6 wherein each of said arms comprises a tongue and groove connecting structure.

8. The airflow deflector assembly as recited in claim 6 wherein said at least one arm of each of said plurality of cover sections is disposed in an interior of a different connected other one of said plurality of cover sections.

9. The airflow deflector assembly as recited in claim 6 wherein said at least one arm of each of connected ones of said plurality of cover sections is disposable transversely across the width of the open bed to at least partially define an airflow deflecting surface.

10. The airflow deflector assembly as recited in claim 1 wherein each of said plurality of cover sections comprises an identical structural configuration.

11. The airflow deflector assembly as recited in claim 1 wherein said attachment assembly of each of said plurality of cover sections includes a plurality of elongated arms, said plurality of arms of connected ones of said plurality of cover sections being disposed transversely across the width of the open bed and in reciprocal, sliding engagement with one another.

12. An airflow deflector assembly as recited in claim 11 wherein each of said plurality of arms of connected ones of said cover sections comprises a tongue and groove connecting structure.

13. The airflow deflector assembly as recited in claim 12 wherein each of said plurality of cover sections comprises an identical structural configuration.

14. The airflow deflector assembly as recited in claim 13 wherein said plurality of arms of each of said plurality of cover sections are disposed in an interior of another one of said connected ones of said plurality of cover sections.

15. The airflow deflector assembly as recited in claim 1 further comprising a mounting assembly at least partially disposed on said base of each of said plurality of cover sections, said mounting assembly structured to removably interconnect a corresponding one of said bases of connected ones of said plurality of cover sections and a corresponding portion of the vehicle.

16. The airflow deflector assembly as recited in claim 15 wherein said mounting assembly comprises a protruding member connected to the corresponding portion of the vehicle, said protruding portion disposable into interconnecting engagement with a corresponding positioned one of said bases.

17. The airflow deflector assembly as recited in claim 16 wherein said mounting assembly comprises a notch assembly formed on said one base, said notch assembly disposed and structured to removably receive said protruding member therein.

18. The airflow deflector assembly as recited in claim 17 further comprising a retaining assembly removably disposed on said one base in retaining relation to said protruding member when received in said notch assembly.

19. An airflow deflector assembly for an open bed of a vehicle comprising:

two cover sections adjustably positionable relative to one another to assume any one of a plurality of operative orientations, each of said two cover sections including a base and an attachment assembly extending outwardly from said base, said attachment assemblies of said two cover sections being slidably and reciprocally connected to one another and cooperatively structured to facilitate relative, reciprocal positioning of corresponding ones of said bases in a direction transversely across a width of the open bed and into said plurality of operative orientations, and each of said plurality of operative orientations comprising said two cover sections collectively extending transversely across and in covering relation to substantially an entire width of a trailing end of the open bed.

20. The airflow deflector assembly as recited in claim 19 wherein at least one of said plurality of operative orientations comprises said attachment assembly of each of said two cover sections disposed transversely across the width of the open bed and in a non-exposed position.

21. The airflow deflector assembly as recited in claim 20 wherein each attachment assembly of said two cover sections is disposed in an interior of said base of the other of said two cover sections.

22. The airflow deflector assembly as recited in claim 21 wherein said at least one of said plurality of operative orientations comprises said bases of said two cover sections collectively defining an airflow deflecting surface.

23. The airflow deflector assembly as recited in claim 19 wherein at least one other of said plurality of operative orientations comprises at least a portion of said attachment assemblies of said two cover sections being disposed transversely across the width of the open bed and in an exposed position exteriorly of said base of the other of said two cover sections.

24. The airflow deflector assembly as recited in claim 23 wherein said portion of each of said attachment assemblies is disposed in an air deflecting position transversely across the width of the open bed and overlying the trailing end of the open bed.

25. The airflow deflector assembly as recited in claim 24 wherein said at least one other of said plurality of operative orientations comprises said base and said attachment assembly of each of said two cover sections collectively disposed transversely across the width of the open bed and defining an airflow deflecting surface.

26. The airflow deflector assembly as recited in claim 19 wherein each of said attachment assemblies includes a plurality of elongated arms, said plurality of arms of each of said two cover sections disposed transversely across the width of the open bed and in substantially offset mating relation to one another.

27. The airflow deflector assembly as recited in claim 26 wherein said plurality of arms of each of said two cover sections comprise a tongue and groove connecting structure.

28. The airflow deflector assembly as recited in claim 26 wherein each of said two cover sections comprise an identical structural configuration.

29. An air flow deflector assembly for a vehicle having an open bed comprising:

two cover sections adjustably connected to one another and relatively positionable to assume any one of a plurality of operative orientations, wherein each of said two cover sections comprises an identical structural configuration thereby requiring only a single cover section configuration to be manufactured, each of said two cover sections including a base and an attachment assembly extending outwardly therefrom, each of said attachment assemblies being cooperatively structured and slidably interconnected to one another to facilitate a reciprocal positioning of corresponding ones of said bases, said base of each of said two cover sections being reciprocally adjustable relative to one another in a direction transversely across and relative to a width of the open bed, a mounting assembly at least partially disposed on said base of each of said two cover sections, said mounting assembly structured to removably interconnect each said base to a corresponding portion of the vehicle, said mounting assembly further comprising two protruding members each connected to one of the corresponding portions of the vehicle, each of said two protruding members disposable into interconnecting engagement with a correspondingly positioned one of said bases, said mounting assembly further comprising a notch assembly formed on each of said bases, each of said notch assemblies disposed and structured to removably receive correspondingly positioned one of said protruding members therein, a retaining assembly removably disposed on each of said bases in retaining relation to one of said protruding members when received in a corresponding one of said notch assemblies, and each of said plurality of operative orientations comprising said two cover sections collectively extending transversely across and in covering relation to substantially an entire width of a trailing end of the open bed.

* * * * *

UNITED STATES PATENT AND TRADEMARK OFFICE
CERTIFICATE OF CORRECTION

PATENT NO. : 7,566,093 B1  Page 1 of 1
APPLICATION NO. : 11/999571
DATED : July 28, 2009
INVENTOR(S) : Embler et al.

It is certified that error appears in the above-identified patent and that said Letters Patent is hereby corrected as shown below:

In the Claims:
In column 11, claim 8, line 42, delete "other".
In column 12, claim 23, line 57, delete "other".

Signed and Sealed this

Twenty-second Day of December, 2009

David J. Kappos
*Director of the United States Patent and Trademark Office*